(12) United States Patent
Söderdahl

(10) Patent No.: US 7,309,063 B2
(45) Date of Patent: Dec. 18, 2007

(54) GAS-FILLED SPRING FOR A VEHICLE, SUCH AS A MOTOR CYCLE, AND VALVE FOR SUCH A GAS-FILLED SPRING

(75) Inventor: Johan Söderdahl, Stockholm (SE)

(73) Assignee: Ohlins Racing AB (SE)

( * ) Notice: Subject to any disclaimer, the term of this patent is extended or adjusted under 35 U.S.C. 154(b) by 0 days.

(21) Appl. No.: 10/717,916

(22) Filed: Nov. 21, 2003

(65) Prior Publication Data

US 2005/0035505 A1     Feb. 17, 2005

(30) Foreign Application Priority Data

Nov. 21, 2002   (SE)   ..................... 0203452

(51) Int. Cl.
*B60G 17/00*   (2006.01)
(52) U.S. Cl. ..................... 267/64.17; 188/286; 188/284
(58) Field of Classification Search ................ 188/285, 188/286, 284, 287; 267/64.17
See application file for complete search history.

(56) References Cited

U.S. PATENT DOCUMENTS

| | | | | |
|---|---|---|---|---|
| 259,634 | A | * | 6/1882 | Crouch ..................... 213/43 |
| 1,151,595 | A | * | 8/1915 | Ingham ..................... 188/286 |
| 1,980,423 | A | * | 11/1934 | Messier ..................... 267/64.11 |
| 2,604,953 | A | * | 7/1952 | Campbell ..................... 416/119 |
| 2,628,692 | A | * | 2/1953 | Hufferd ..................... 188/285 |
| 3,960,251 | A | * | 6/1976 | Gorissen ..................... 188/286 |
| 4,693,454 | A | * | 9/1987 | Tsuchiya et al. ............. 267/226 |
| 4,700,611 | A | * | 10/1987 | Kaneko ..................... 91/405 |
| 4,700,815 | A | * | 10/1987 | Persicke et al. ............ 188/286 |
| 4,819,770 | A | * | 4/1989 | Hahn ..................... 188/284 |
| 5,069,317 | A | * | 12/1991 | Stoll et al. ..................... 188/286 |

(Continued)

FOREIGN PATENT DOCUMENTS

DE    1 282 364    11/1968

(Continued)

OTHER PUBLICATIONS

Patent Abstracts of Japan, vol. 2002, No. 5, May 3, 2002, JP 2002 005211 A (Showa Corp.), Jan. 9, 2002 (Abstract).

(Continued)

*Primary Examiner*—Melanie Torres
(74) *Attorney, Agent, or Firm*—Connolly Bove Lodge & Hutz LLP

(57) ABSTRACT

A gas-filled spring (1) operates using gas (13, 14) and may be intended for a motor cycle. The gas-filled spring comprises a cylinder (2) and a piston (4), said cylinder comprising a compression chamber and a return chamber (8, 9). An arrangement maintains the necessary quantities of gas and gas pressure settings or differential pressures in the chambers despite any gas leakage and temperature variations occurring. Arranged between the chambers is a passage (12), which is open only in a predetermined position of the cylinder and the piston relative to one another. In the open position gas transfer between the chambers and/or pressure equalization in or differential pressure adjustment of the gas pressures in the chambers are permitted. The invention also relates to a valve for counteracting rapid changes in leakage and temperature. The desired spring characteristic of the gas-filled spring can in this way be maintained despite leakage and temperature variations.

10 Claims, 3 Drawing Sheets

U.S. PATENT DOCUMENTS

Figure 1:
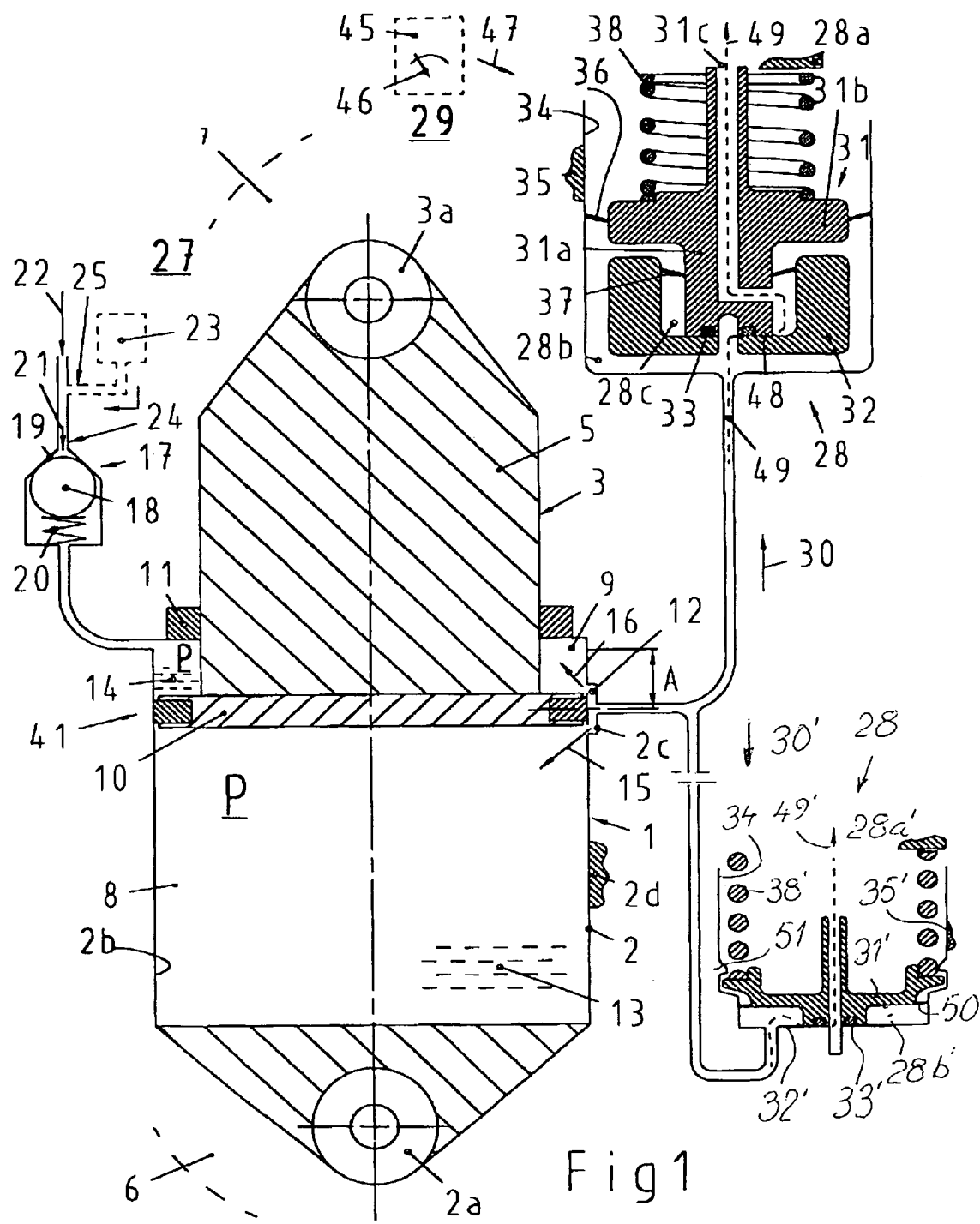

| | | |
|---|---|---|
| 5,450,933 A | 9/1995 | Schuttler |
| 5,588,641 A | 12/1996 | Sand |
| 6,213,261 B1* | 4/2001 | Kunkel ................. 188/314 |
| 6,454,061 B1* | 9/2002 | Antonovsky ............ 188/280 |
| 6,588,555 B2* | 7/2003 | Rottenberger et al. ..... 188/285 |
| 6,612,410 B1* | 9/2003 | Antonovsky ............ 188/280 |
| 2002/0079177 A1* | 6/2002 | Akad ................. 188/322.19 |

FOREIGN PATENT DOCUMENTS

| | | |
|---|---|---|
| DE | 21 11 713 A | 9/1972 |
| EP | 0347 921 A2 | 12/1989 |
| EP | 0 847 885 A2 | 6/1998 |
| EP | 0 852 303 A1 | 7/1998 |
| FR | 75835 | 8/1961 |
| FR | 76017 | 1/1962 |

OTHER PUBLICATIONS

Patent Abstracts of Japan, vol. 2002, No. 6, Jun. 4, 2002, JP 2002 054346 A (Showa Corp.), Feb. 20, 2002 (Abstract).

* cited by examiner

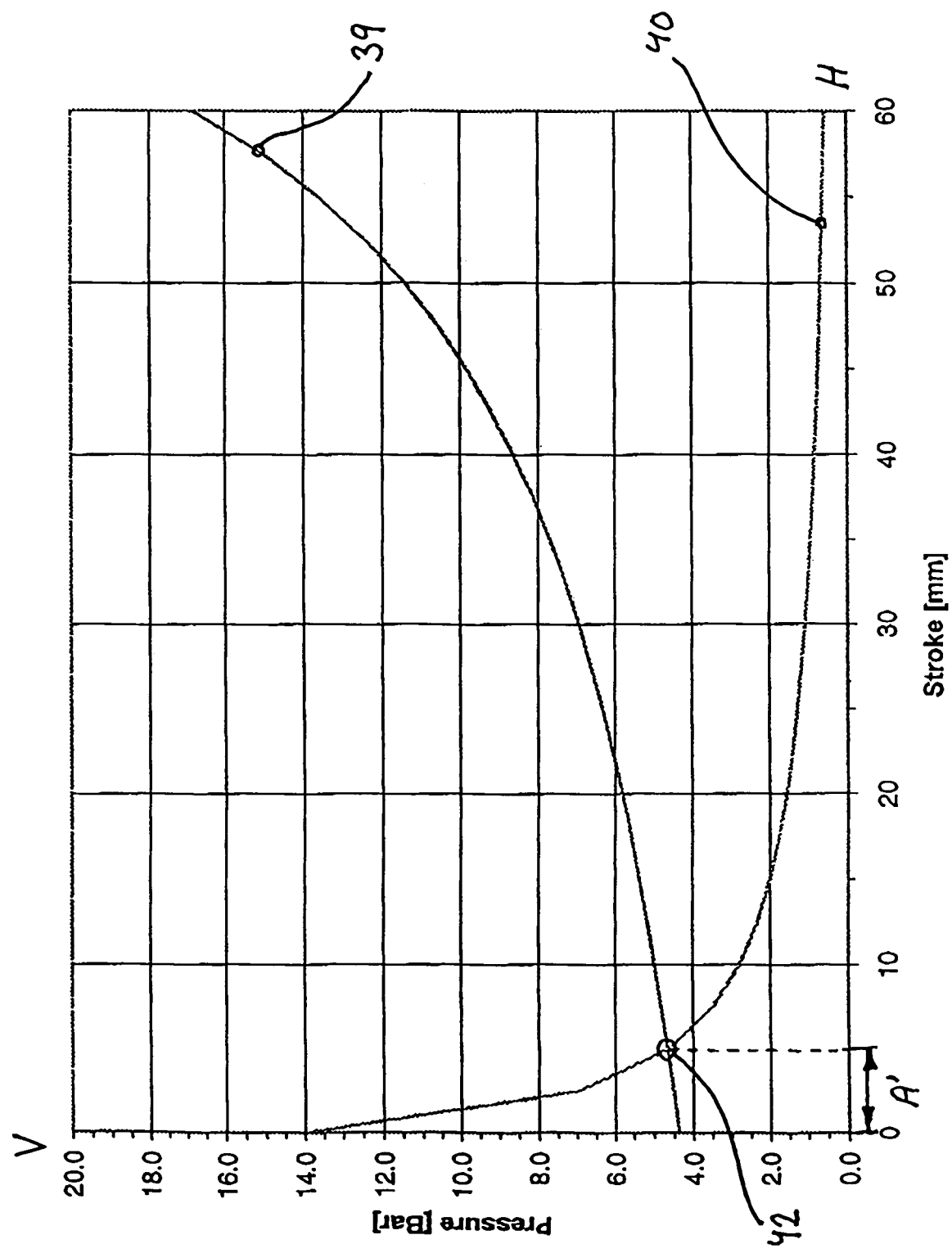

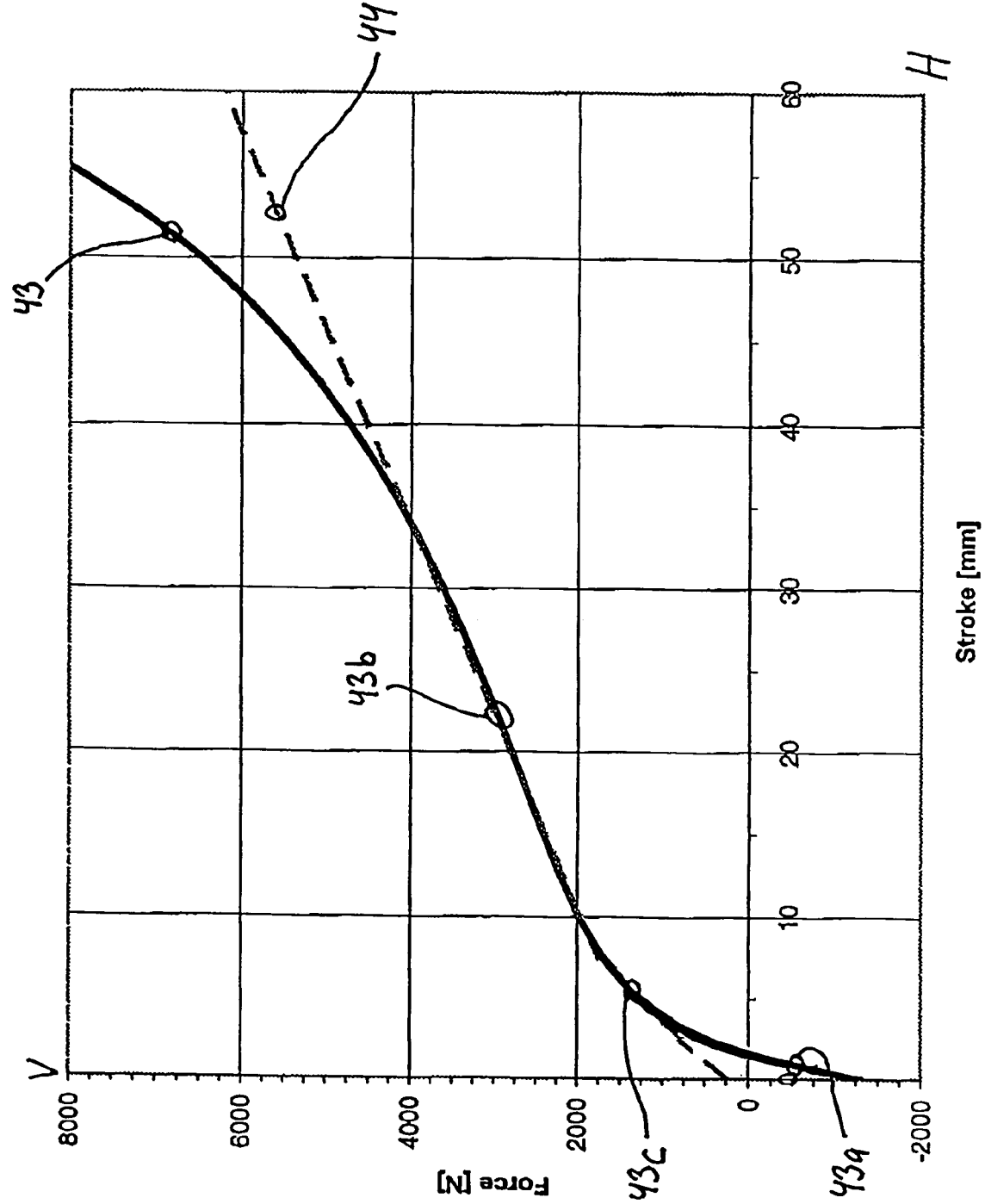

GAS-FILLED SPRING FOR A VEHICLE, SUCH AS A MOTOR CYCLE, AND VALVE FOR SUCH A GAS-FILLED SPRING

The present invention relates to a spring (spring device) that operates using gas and is primarily intended for a vehicle, such as a motor cycle or car, in which the gas-filled spring comprises a cylinder and at least one piston which operates therein and which divides the internal space of the cylinder into a compression chamber and an expansion chamber or return chamber. Here, an arrangement is designed to ensure maintenance of the necessary quantities of gas and gas pressure settings or differential pressures in the chambers despite any gas leakage occurring, for example between cylinder and piston, and/or temperature variations occurring inside and outside the gas-filled spring.

The invention also relates to a valve forming part of or belonging to a gas-filled spring which operates using gas and comprises a cylinder and a piston which operates therein and which divides the space into a compression chamber and an expansion chamber in which the gases in the chambers are subject to changes in volume and/or pressure, so that the spring characteristic of the gas-filled spring remains constant or essentially constant or varies in a predefined way when the gas-filled spring is in use.

The use of gas-filled springs of the said type in connection with vehicles is already known. Reference might be made here to gas-filled springs available on the market and described in the patent literature. Also known in the art is the use, in connection with gas-filled springs of this type, of a valve which regulates the quantity of gas and/or the gas pressure in the gas-filled spring.

Gas in this context relates to air and any anticorrosive agents or lubricants mixed in with this.

It is known that in the operation of gas-filled springs of this type the gas leaks out from the cylinder when the piston moves in the cylinder internal space. The leakage can occur via the seal or seals between the cylinder and the piston. It is also known that the internal and external temperatures of the gas-filled spring can in certain cases vary markedly due, for example, to energy absorption in the damping system and due to the fact that the ambient temperature fluctuates. This means that special arrangements must be in place or must be made in the gas-filled spring so that the change in gas volume or gas pressure can be varied accordingly, in order that the gas-filled spring can maintain a desired spring characteristic. This is one of the problems which the invention is intended to address.

There is also a need to use an adjustable gas-filled spring, the spring characteristic of which, for example, can be modified by adjusting a regulating device and/or changing components of the gas-filled spring. In one embodiment, it must be possible to fix the spring characteristic, whereas, in another embodiment, it must be adjustable, for example by means of computer adjustments, manual adjustments by means of knob or regulator etc. The spring characteristic must be adjustable, for example, according to how the vehicle is used, for example on main roads and/or off-road, in competition racing etc. It must be possible to keep the pressure levels in the chambers constant or essentially constant and/or to adjust these in a predefined way. In certain contexts, the gas-filled spring must be self-sufficient from an energy standpoint or be capable of utilizing the energy supplied in a precise way. The energy supply must also be capable of functioning automatically. The energy must be reliably supplied on the compression stroke and, on the expansion or return stroke, the energy must likewise be dissipated reliably yet rapidly. The arrangement is aimed at increasing the comfort afforded by the vehicle when driving on uneven ground, driving over raised objects (such as rock or stones, for example) on the carriageway etc. It is also an object of the invention to solve this entire problem or elements thereof.

In connection with the use of the aforementioned valve which discharges air or gas, it is important that this operates with rapid functions, by which we mean the opening and closing sequence that can be performed with opening and closing movements. The invention is also intended to address this problem.

A gas-filled spring according to the invention is essentially characterized, among other things, in that the arrangement comprises one or more passages which is/are arranged between the chambers and is/are open only in a predetermined position of the cylinder and the piston relative to one another, and that each time the piston passes the said relative position during the movement of the piston in the internal space, the passage(s) thereby opened is/are designed to permit gas transfer between the chambers and/or pressure equalization in or differential pressure adjustment of the gas pressures in the chambers.

In developments of the idea of the invention, the relevant position, which will henceforth be referred to as the first position, is arranged with a relatively small offset from the fully expanded position of the gas-filled spring. The offset position or the offset distance may be in the order of 1 to 50 mm, for example approximately 5 mm from the said first position. In the said first position, the selected pressure in the chambers is preferably relatively low, for example in the order of 1 to 20 bar. Looking at the force-stroke curve for the gas-filled spring, the curve function performed by the gas is provided (functions) with gentle curve transitions preferably over the entire stroke range, which contributes to a substantial increase in ride comfort.

Further developments of the idea of the invention may mean that the expansion chamber or the return chamber is connected to or comprises a non-return valve function forming part of the arrangement and designed to supply gas to the expansion chamber if the gas volume or the gas pressure is less than a predetermined gas volume or predetermined gas pressure. The non-return valve function can then be connected to the surrounding atmosphere or atmospheric pressure if the gas volume or gas pressure is too low. The non-return valve function may also connect to a gas volume or gas pressure-boosting element forming part of the arrangement, which in a preferred embodiment consists of a pump, if the gas volume or gas pressure is too low. In a preferred embodiment, in the said open position(s), gas can be discharged via a pressure-relief valve function forming part of the arrangement, for example a function which leads to the surrounding atmosphere, should the pressure have risen in one or both of the chambers due to an increase in temperature, for example. The arrangement may furthermore comprise an adjusting element, such as a manually actuatable adjusting element, designed to produce an external adjustment of the gas volume and/or gas pressure in one or both of the chambers of the gas-filled spring. The arrangement may be designed to alter the said position as a function of the adjustment, for example a manual adjustment.

The aforementioned valve or pressure-relief valve is essentially characterized in that it is designed, in a predetermined or set position of the cylinder and the piston relative to one another, to effect an exceptionally rapid gas discharge which counteracts the aforementioned changes and hence undesirable variations in the spring characteristic.

In a preferred embodiment the pressure-relief valve comprises a spring-loaded piston, which, as a function of its longitudinal displacement, keeps a duct or port for the discharge of gas open or closed, and that arranged in the said piston is a diaphragm which detects a pressure differential between the space in question and the surrounding atmosphere or pressure relief arrangement. In the said duct or port, the piston may be provided with a seal, for example an O-ring seal, arranged in a protected position adjoining the piston and its seat. A spring function providing the spring loading may be adjustable or interchangeable for adjusting the desired control position.

The aforementioned proposals provide a gas-filled spring which functions reliably and is constructed from technically simple means and arrangements known in the art. The gas-filled spring can be designed to adjust rapidly to variations in temperatures and/or any gas leakages occurring. The gas-filled spring can be designed with automatic control or adjustable control of the relevant gas volumes, gas pressures, air pressure differentials, spring characteristics etc. The valve is of relatively simple construction and works with the intended rapid functions which counteract changes in the said gas parameters and which spare or protect any necessary seal used from mechanical action, which results in a relatively long service life of the gas-filled spring.

A currently proposed embodiment of a gas-filled spring and a valve (pressure-relief valve) according to the invention will be described below with reference to drawings attached, in which FIG. 1 shows a vertical, schematic view of the construction of the gas-filled spring with cylinder, piston, and parts of an arrangement for controlling gas volumes, pressures, and pressure differentials, the gas-filled spring also comprising or being connected to a valve (pressure-relief valve) for acting on and/or maintaining the said parameters, FIG. 2 in diagrammatic form shows a pressure/stroke curve for the gas-filled spring according to FIG. 1, FIG. 3 in diagrammatic form shows the force/stroke curve for the spring according to FIG. 1.

In FIG. 1, a gas-filled spring according to the invention is symbolized by 1. The gas-filled spring comprises a cylinder 2 and a piston and piston rod arrangement 3, in which 4 denotes the piston and 5 the piston rod. The cylinder is designed with a fixing element 2a, to which a wheel 6 can be applied or arranged in a manner known in the art. The piston rod is designed with a fixing arrangement 3a for fixing to a schematically indicated chassis 7 in a vehicle, such as a motor cycle. The piston 4 divides the internal space of the cylinder 2 into two sub-chambers. 8 denotes a compression chamber below the piston 4 and 9 an expansion or return chamber. The piston is provided with a ring seal 10, by means of which the piston interacts with an inner surface 2b in the cylinder chamber. The piston rod is sealed off from a cylinder part (not specially identified) by a seal 11. The cylinder is designed with a widened part 2c, in which a passage 12 can be established between the chambers 8 and 9 when the piston assumes a predefined position, this position being represented by the position shown in FIG. 1. In this position, the sealing element does not form a seal against the cylinder wall 2b, thereby permitting the existence or opening of the duct 12. Gas, for example air or a mixture of air and a suitable lubricant or anticorrosive agent, is introduced into the space 8. The gas in the chamber 8 is denoted by 13. The expansion or return chamber 9 is similarly provided with a corresponding gas or air mixture stroke, which is denoted by 14. In the position shown in FIG. 1, the gases 13 and 14 are in contact with one another and, via the duct 12 in question, gas can be transferred from one chamber to the other chamber, which is symbolized by direction arrows 15 and 16. In the position in question, changes in the gas volume, pressure variations and changes in the pressure differential can be effected between the two chambers 13 and 14. The body of the cylinder is denoted by 2d.

The invention works with a non-return valve function 17, which in one embodiment may comprise a ball 18, a seat 19 and a spring 20, which presses the ball against the seat. The non-return valve function may work and be designed with another function. By way of the non-return valve function 17, air or an air mixture is delivered to the chamber 14. The delivery direction is indicated by 21 and arises when the pressure in the expansion or return chamber 14 is less than the relevant feed pressure 21.

In this case the feed pressure may be represented by the atmospheric pressure 22. When connected to the atmospheric pressure 22, the spring 1 becomes self-sufficient or self-sustaining from an energy standpoint.

Alternatively, the pressure supply source may consist of a pump 23 or the like or some other excess pressure-generating element or external energy source. The embodiment with the pump 23 has been shown drawn in, and the pump arrangement 23 connects to the connecting line 24 of the non-return valve function 17 or an equivalent connecting element. The alternative connection is denoted by 25 and the air pressure or air flow generated by this is denoted by 26. In one alternative, both of the connection facilities may be provided, the pressure source in question being connected by means of inlet and outlet coupling elements known in the art. Should gas expansion in the return chamber cause the pressure in the chamber 9 to fall below the prevailing feed pressure or atmospheric pressure, gas is therefore supplied to the chamber in question from the relevant pressure source(s), generally denoted by 27. In the example of embodiment shown, the non-return valve function is of non-adjustable design.

In the example of embodiment according to FIG. 1, the arrangement for controlling gas volume, pressure and pressure differential in the chambers 13 and 14 also comprises a pressure-relief valve 28. For the sake of clarity, in FIG. 1, this valve is represented schematically solely by the parts in direct contact with the present invention. The said pressure-relief valve 28 is here designed to permit the discharge of gas from the chambers 13 and/or 14, said discharge passing into the surrounding atmosphere 29. A direction of discharge for the gas in question is indicated by 30. Gas is discharged when the pressure exceeds the preset, fixed or continuously adjustable value of the pressure-relief valve. Other types of monitoring function are possible and reference is made here to non-return valve functions known in the art. When the piston 4 in its stroke movements in the cylinder has passed the position or the duct 12 there is no pressure relief to the surrounding atmosphere via the pressure-relief function 28 shown.

The valve 28 comprises a piston 31, which works against a seat 32. At its end 31a, the piston is provided with a sealing function, which in this case has the function of an O-ring seal 33. The piston is applied to an inner surface 34 of a body part 35 of the valve by means of a first diaphragm 36. In addition, the piston is anchored to the seat 32 by way of a second diaphragm 37. The piston is pressed against the seat by means of a spring 38, which in one embodiment may be of adjustable design. The pressure-relief valve 28 determines the pressure level in the pressure equalization position of the piston 4 according to FIG. 1. The spring 38 is arranged between a schematically represented support 28a in the valve. The diaphragms 36 and 37 each seal off a space 28b and 28c respectively in the valve 28. The piston 31 is designed with a flanged section 31b and a duct 31c extending internally in the longitudinal direction of the piston. The diameter of the section 31b exceeds the diameter of the end part 31a by a substantial amount, being 2-4 times greater, for example. The diaphragms serve to make the arrangement of the piston laterally rigid, whereas it is slightly pliable in its longitudinal direction. As the piston opens, a duct 48 for the gas 49 is opened via a [lacunae?] at the end part 31a and the seat 32. On opening, the gas 49 can be led via the space 28c and the internal duct 31c to the surrounding atmosphere. The diaphragm 36 has inside and outside diameters. In this way a pronounced pressure differential is obtained which together with the difference in area of the diaphragms (which is substantial) gives rise to an adjusting force, which can counteract the spring force of the spring 38. The selected force levels in the valve 28 are high in relation to the weights of the components affected, which makes rapid accelerations, that is to say short opening times of the piston 31, possible.

FIG. 1 shows a distance A, which is intended to indicate the distance for the movement of the piston 4 from a limit position (upper limit position) in the cylinder and the position indicated in FIG. 1 that leads to opening of the passage 12. According to one example of an embodiment of the invention, this chosen distance ranges from 1 to 50 mm and in the example shown it is approximately 5 mm.

If the pressure in the chamber 8 is too low, gas or pressure is transferred from the chamber to the chamber 8 via the duct 12 when this assumes the position shown in FIG. 1. If excess pressure occurs due to increases in the temperature of the gas in the chambers 8, 14, gas is discharged, as described above, via the pressure-relief valve function 28. By keeping the gas volume, pressure, and pressure differential in the chambers 8, 14, it is possible to keep the pressure P in the chambers essentially constant, which means that the gas-filled spring can function with a predetermined spring characteristic. As will be shown below, the pressure in the chambers is relatively low when the piston 4 assumes the position shown in FIG. 1 and it can therefore be stated that the pressure in the chambers will be equal and assume values of between 1 and 20 bar, preferably 3 to 8 bar.

In FIG. 2, the horizontal axis H of the diagram shows the stroke in millimetres, whilst the vertical axis V shows the pressure in the chambers in bar. In this case the strokes may vary between 0 and 60 mm and the pressure between 0 and 20 bar. 39 denotes the curve for the compression stroke in the compression chamber 8, whilst a curve 40 shows a stroke-pressure curve in the expansion or return chamber. The position 41 of the piston (cf. FIG. 1) corresponds to a point of intersection 42 of the curves 39 and 40. It will be seen from this that the point of intersection occurs at a pressure value of approximately 4.5 bar and a distance A' of approximately 5 mm, calculated from the fully expanded position.

FIG. 3 is intended to show a diagram of the force-stroke curve for the new gas-filled spring. The horizontal axis again shows the stroke in millimetres, while the vertical axis V shows the spring force N developed by the gas-filled spring. A curve 43 is attributable to the gas-filled spring described above, while a curve 44 is attributable to a spring (coil spring) of prior art. The curve 43 is characterized by a gently curved part 43a adjoining the zero area of the spring and before levelling away in part 43b via a gentle curve shape 43c, which gives a nice, soft ride comfort or springing in the vehicle in question. According to the diagram, strokes of between 0 and 60 mm and forces of between 0 and 8000 N are used.

According to further developments of the invention, the arrangement may comprise an adjusting element, such as a manually actuatable adjusting element, which produces an external adjustment of the gas volume and/or gas in one or both of the chambers of the spring. Such an adjusting element is indicated schematically by 45 in FIG. 1. The regulating element may comprise an adjustment function 46, by means of which the function, and also the valve 28, can be actuated. This actuation has been symbolized by 47. The adjusting element 45 may alternatively consist of a computer-based adjusting element.

Alternatively or in addition, the actuation function 47 may be designed so that the pressure levels in the gas-filled spring are adjusted. The spring force of the spring 38 can also be adjusted in order to adjust the spring force of the gas-filled spring. The spring force or the spring characteristic can be adjusted by changing the spring 38, shifting the spring stop 28a etc. In one embodiment, an electromagnet can be used in order to vary the spring force of the spring 38. The spring characteristic of the gas-filled spring 1 can also be varied or set by means of changes in the volumes of the chambers 8, 9. Shifting of the points of intersection 42 (see FIG. 2) and/or the position of the duct 12 (cf. above) can also be used for adjustments, settings etc. of the spring characteristic of the gas-filled damper. It is also feasible to shift the duct 12 or the position 41 in the cylinder vertically (up or down) in order to create another point of intersection 42 of the curves 39 and 40.

In FIG. 1, a passage or duct that can be established in the valve 28 (pressure-relief valve) is shown by 48 and a gas discharge flow from the gas filled-spring to the atmosphere via the valve 28 is indicated by 49. The said arrangement is exercised from the position 41 and the components 17, 23 and 28. In the vehicle in question, the gas-filled spring 1 with associated valve function 28 can be integrated with a damper exercising a damping function, which can be performed in a manner known in the art, which has not been depicted for the sake of clarity.

FIG. 1 also shows a simplified embodiment of pressure-relief valve 28' which can be alternative or supplement to valve 28. In valve 28' comprises a piston arrangement 31' which cooperates with the bottom surface 32' of the valve house 35'. The piston arrangement is actuated by spring 38' and is adapted, together with the spring, in a space defined by the inner surface 34'. The gas 49' is conducted via a seal arrangement 33' between the piston 31' and the surface 32' in a way which is similar to the gas 49. The valve 28' is in this embodiment provided with one membrane, only, which keeps spaces 28a', and 28b'separated. The stroke of the piston is limited by means of an inwardly directed flange 51. When the piston 31, 31' are actuated gas 49, 49' can be conducted. (see dotted lines). In the closed position of the piston gas is prevented to be conducted by the seals 33, 33'.

The invention is not limited to the embodiment shown above by way of example, but lends itself to modifications within the scope of the following patent claims and the idea of the invention.

The invention claimed is:

1. A gas-filled spring for a vehicle, said gas-filled spring operating, wherein said gas-filled spring comprises:
   a cylinder; and
   at least one piston that operates therein and divides an internal space of the cylinder into a compression chamber and an expansion chamber;

a self-pumping and self-balancing arrangement designed to ensure maintenance of necessary quantities of gas as well as gas pressure settings or differential pressures in the compression chamber and the expansion chamber in order to provide optimal spring function despite any gas leakage occurring and despite temperature variations occurring inside and outside the gas-filled spring, wherein the arrangement comprises:

a means for transferring gas between said compression chamber and said expansion chamber, said means for transferring gas between said compression chamber and said expansion chamber comprising at least one passage which is arranged between the compression chamber and the expansion chamber, said at least one passage being formed in a widened portion of the cylinder such that said at least one passage is open in only one predetermined position of the cylinder and the piston relative to one another, wherein, each time the piston passes said predetermined position during movement of the piston in the internal space, the at least one passage is thereby opened and permits at least one of the following: gas transfer between the compression chamber and the expansion chamber, pressure equalization in the compression chamber and the expansion chamber, and differential pressure adjustment of gas pressures in the compression chamber and the expansion chamber;

a pressure source for loading the spring with gas and maintaining gas pressure in the spring; and a pressure relief mechanism for relieving air when gas pressure in the compression chamber or the expansion chamber rises over a predetermined value, and wherein, in said predetermined position, gas can be discharged via a pressure-relief valve assembly, should gas pressure have risen in one or both of the compression chamber and the expansion chamber due to an increase in temperature.

2. A gas-filled spring according to claim 1, wherein said predetermined position is situated at a relatively short offset distance from a fully expanded position of the gas-filled spring.

3. A gas-filled spring according to claim 2, wherein, in said predetermined position, gas pressure in the compression chamber and the expansion chamber is relatively low compared to a maximum pressure of the compression chamber and the expansion chamber occurring in the functioning of the gas-filled spring.

4. A gas-filled spring according to claim 1, wherein, in a force-stroke curve produced by the gas, gentle curve transitions are executed throughout a stroke length range of the piston.

5. A gas-filled spring according to claim 1, wherein the expansion chamber is connected to or comprises a non-return valve assembly forming part of the arrangement and designed to deliver gas to the expansion chamber if the pressure in the expansion chamber is less than atmospheric pressure or a feed pressure of the gas-filled spring.

6. A gas-filled spring according to claim 5, wherein the non-return valve assembly connects to a surrounding atmosphere or atmospheric pressure if the gas volume or gas pressure is too low in the expansion chamber.

7. A gas-filled spring according to claim 6, wherein the non-return valve assembly connects to a gas volume or gas pressure-boosting element forming part of the arrangement if the gas volume or gas pressure is too low in the expansion chamber.

8. A gas-filled spring according to claim 1, wherein the arrangement comprises an adjusting element designed to produce an external adjustment of at least one of gas volume and gas pressure in one or both of the compression chamber and the expansion chamber.

9. A gas-filled spring for a vehicle, said gas-filled spring operating, wherein said gas-filled spring comprises:

a cylinder; and at least one piston that operates therein and divides an internal space of the cylinder into a compression chamber and an expansion chamber;

a self-pumping and self-balancing arranegment designed to ensure maintenance of necessary quantities of gas as well as gas pressure setting or differential pressures in the compression chamber and the expansion chamber in order to provide optimal spring function despite any gas leakage occurring and despite temperature variation occurring inside and outside the gas-filled spring, wherein the arranegment comprises:

a means for transferring gas between said compression chamber and said expansion chamber, said means for transferring gas between said compression chamber and said expansion chamber comprising at least one passage which is arranged between the compression chamber and the expansion chamber, said at least one passage being formed in a widened portion of the cylinder such that said at least one passage is open in only one predetermined position of the cylinder and the piston relative to one another, wherein, each time the piston passes said predetermined position during movement of the piston in the internal space, the at least on passage is thereby opened and permits at least one of the following: gas transfer between the compression chamber and the expansion chamber, pressure equalization pressure adjustment of gas pressures in the compression chamber, and differential pressure adjustment of gas pressures in the compression chamber and the expansion chamber;

a pressure source for loading the spring with gas and maintaining gas pressure in the spring; and a pressure relief machanism for relieving air when gas pressure in the compression chamber or the expansion chamber rises over a predetermined value, and wherein said pressure relief mechanism is connected to said at least one passage and wherein gas is relieved via said pressure relief mechanism only when said piston passes said predetermined position.

10. A gas-filled spring for a vehicle, said gas-filled spring operating using gas, wherein said gas-filled spring comprises:

a cylinder; and at least one piston that operates therein and divides an internal space of the cylinder into a compression chamber and an expansion chamber;

a self-pumping and self-balancing arrangement designed to ensure maintenance of necessary quantities of gas as well as gas pressure settings or differential pressures in the compression chamber and the expansion chamber in order to provide optimal spring function despite any gas leakage occurring and despite temperature variations occurring inside and outside the gas-filled spring, wherein the arrangement comprises:

a means for transferring gas between said compression chamber and said expansion chamber, said means for transferring gas between said compression chamber and said expansion chamber comprising at least one passage which is arranged between the compression chamber and the expansion chamber, said at least one passage being formed in a widened portion of the cylinder such that said at least one passage is open in only one predetermined position of the cylinder and the piston relative to one another, wherein, each time the piston passes said predetermined position during movement of the piston in the internal space, the at least one passage is thereby opened and permits at least one of the following: gas transfer between the compression chamber and the expansion chamber, pressure equalization in the compression chamber and the expansion chamber, and differential pressure adjustment of gas pressures in the compression chamber and the expansion chamber;

a pressure source for loading the spring with gas and maintaining gas pressure in the spring; and a pressure relief mechanism for relieving gas when gas pressure in the compression chamber or the expansion chamber rises over a predetermined value, wherein said pressure relief mechanism is connected to said at least one passage, and wherein gas is relieved via said pressure relief mechanism only when said piston passes said predetermined position.

* * * * *